US010687183B2

(12) United States Patent
Shumaker et al.

(10) Patent No.: US 10,687,183 B2
(45) Date of Patent: Jun. 16, 2020

(54) SYSTEMS AND METHODS FOR DELAYING SOCIAL MEDIA SHARING BASED ON A BROADCAST MEDIA TRANSMISSION

(71) Applicant: Red Hat, Inc., Raleigh, NC (US)

(72) Inventors: Spenser Shumaker, Raleigh, NC (US); Dan Varga, Raleigh, NC (US)

(73) Assignee: RED HAT, INC., Raleigh, NC (US)

( * ) Notice: Subject to any disclaimer, the term of this patent is extended or adjusted under 35 U.S.C. 154(b) by 417 days.

(21) Appl. No.: 14/184,429

(22) Filed: Feb. 19, 2014

(65) Prior Publication Data

US 2015/0237464 A1 Aug. 20, 2015

(51) Int. Cl.
*H04L 29/08* (2006.01)
*H04L 29/06* (2006.01)
*H04W 4/21* (2018.01)
*H04L 12/58* (2006.01)

(52) U.S. Cl.
CPC .............. *H04W 4/21* (2018.02); *H04L 51/20* (2013.01); *H04L 51/32* (2013.01)

(58) Field of Classification Search
CPC ....... H04L 51/20; H04L 51/32; H04L 65/604; H04L 65/4053; H04L 65/1089; H04W 4/02; G06N 99/005; G06Q 50/01; H04N 21/4788; H04N 21/4334
See application file for complete search history.

(56) References Cited

U.S. PATENT DOCUMENTS 8,510,770 B1 8/2013 Oztaskent et al.
8,535,131 B2 9/2013 Packard et al.
9,110,988 B1 * 8/2015 Tan ................... G06F 17/30784
9,384,242 B1 * 7/2016 Varadarajan ............ G10L 25/54
2009/0009605 A1 * 1/2009 Ortiz ...................... H04N 5/232
348/157
2009/0144785 A1 * 6/2009 Walker ................ G11B 27/034
725/105

(Continued)

OTHER PUBLICATIONS http://www.overdigital.com/2012/02/07/the-mystery-behind-live-streaming-delay/, The Mystery Behind Live Streaming Delay, May 30, 2014, pp. 1-5.

(Continued)

*Primary Examiner* — Kamal B Divecha
*Assistant Examiner* — Clifton Houston
(74) *Attorney, Agent, or Firm* — Haynes and Boone, LLP

(57) ABSTRACT

Systems and methods are provided for delaying social media sharing based on a broadcast media transmission. An exemplary method includes determining a location of a user and associating the location of the user with an event occurring at the location. The method further includes accessing a social media content from a social networking account of the user, verifying the social media content comprises time sensitive content corresponding to the event, and applying a delay to distribution of the social media content based on the time sensitive content. The time sensitive content may include content occurring before a broadcast of broadcaster media content corresponding to the event. The method may include receiving the broadcaster media content and determining the delay using the broadcaster media content, or the method may include receiving a broadcaster delay for the broadcaster media content for use as the delay.

19 Claims, 6 Drawing Sheets

(56) References Cited

U.S. PATENT DOCUMENTS

| | | | |
|---|---|---|---|
| 2009/0187486 A1* | 7/2009 | Lefenfeld | G06Q 30/02 705/14.73 |
| 2012/0077522 A1* | 3/2012 | Mate | H04N 21/2187 455/456.3 |
| 2012/0079067 A1 | 3/2012 | Stout et al. | |
| 2012/0197995 A1* | 8/2012 | Caruso | G06F 17/3089 709/204 |
| 2012/0210348 A1* | 8/2012 | Verna | H04N 5/781 725/25 |
| 2012/0239661 A1* | 9/2012 | Giblin | G06F 17/30817 707/741 |
| 2012/0320013 A1* | 12/2012 | Perez | H04N 5/91 345/207 |
| 2013/0054447 A1* | 2/2013 | Ross | G06Q 40/025 705/38 |
| 2013/0086615 A1* | 4/2013 | Williams | H04N 21/41407 725/62 |
| 2013/0132836 A1* | 5/2013 | Ortiz | H04N 1/32101 715/716 |
| 2013/0227086 A1 | 8/2013 | Stout | |
| 2013/0232520 A1* | 9/2013 | Stallings | H04N 5/76 725/14 |
| 2013/0268962 A1* | 10/2013 | Snider | H04N 21/8547 725/32 |
| 2013/0275506 A1 | 10/2013 | Warner | |
| 2014/0108602 A1* | 4/2014 | Barnes | H04L 67/18 709/217 |
| 2014/0136591 A1* | 5/2014 | Hoberman | H04L 67/306 709/201 |
| 2014/0140679 A1* | 5/2014 | Khader | H04N 21/8547 386/239 |
| 2014/0164511 A1* | 6/2014 | Williams | H04L 67/306 709/204 |
| 2014/0214980 A1* | 7/2014 | Jung | H04L 51/12 709/206 |
| 2014/0214983 A1* | 7/2014 | Hossack | H04L 51/04 709/206 |
| 2014/0237043 A1* | 8/2014 | Walsh | H04L 65/403 709/204 |
| 2014/0279731 A1* | 9/2014 | Yakovenko | G06N 20/00 706/12 |
| 2014/0280564 A1* | 9/2014 | Darling | G06Q 50/01 709/204 |
| 2014/0280571 A1* | 9/2014 | Tarbox | G06Q 50/01 709/204 |
| 2014/0297260 A1* | 10/2014 | Allen | G06F 40/103 704/9 |
| 2014/0297745 A1* | 10/2014 | Tarbox | H04L 65/604 709/204 |
| 2015/0156236 A1* | 6/2015 | McCall | H04L 65/60 709/204 |
| 2015/0382061 A1* | 12/2015 | Maisenbacher | H04N 21/4542 725/28 |
| 2016/0014477 A1* | 1/2016 | Siders | H04N 21/2747 725/32 |

OTHER PUBLICATIONS http://ideaengineers.sapient.com/strategy/social-media-goes-for-gold-at-london-2012-olympics/, Derek Kopen, Social Media Goes for Gold at London 2012 Olympics, but Takes Silver, Aug. 16, 2012, pp. 1-4.

http://blogs.adobe.com/socialpractice/exploring-the-pros-and-cons-of-twitter-in-real-time-events/, Exploring the Pros and Cons of Twitter in Real-Time Events, Aug. 21, 2012, pp. 1-2.

http://www.tnl.net/blog/2012/07/28/when-live-broadcast-isnt/, When Live Broadcast Isn't, Jul. 28, 2012, pp. 1-8.

* cited by examiner

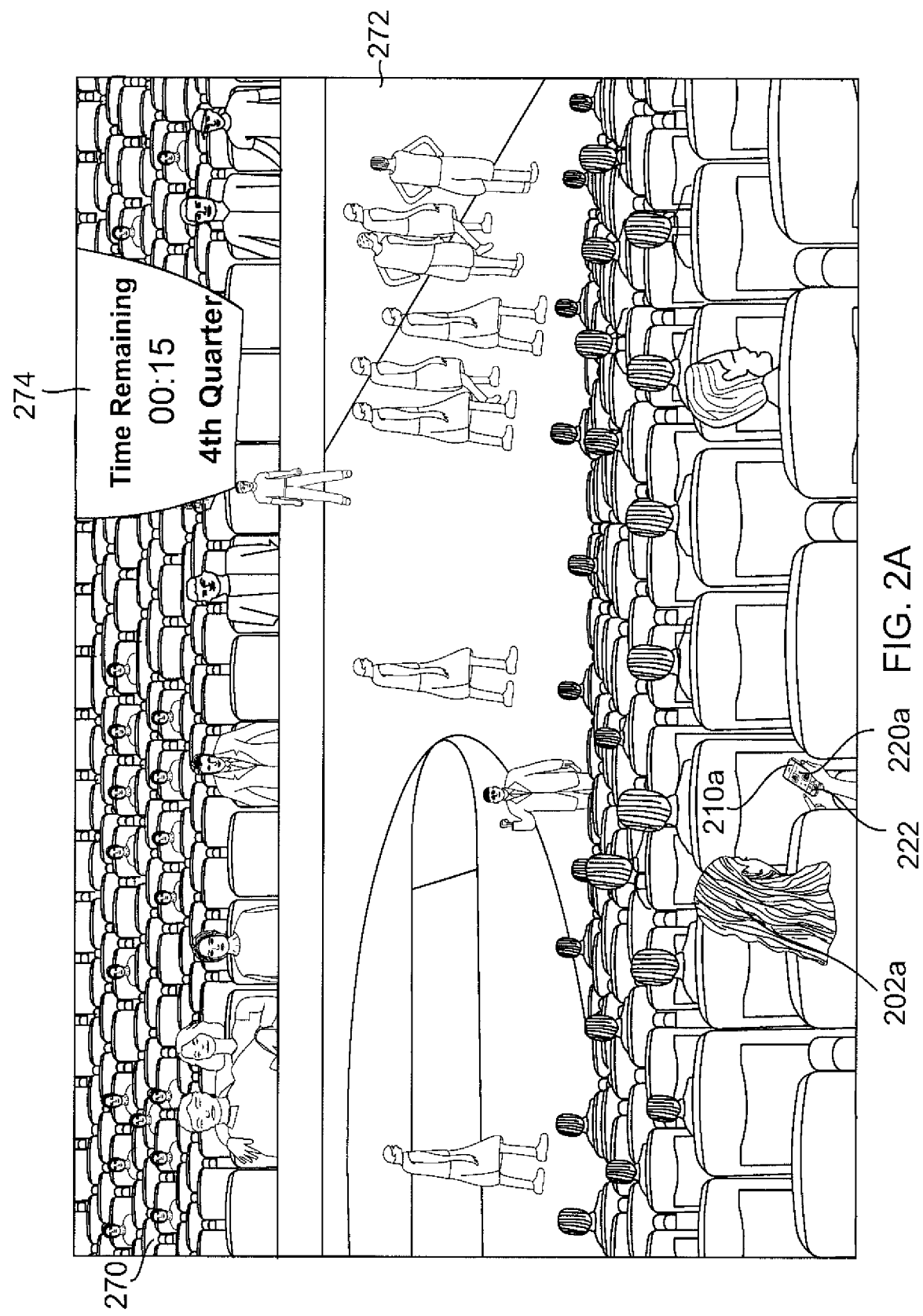

SYSTEMS AND METHODS FOR DELAYING SOCIAL MEDIA SHARING BASED ON A BROADCAST MEDIA TRANSMISSION

FIELD OF DISCLOSURE

The present disclosure generally relates to a social networking system, and more particularly to delaying social media sharing based on a broadcast media transmission.

BACKGROUND

Social networking services may include servers and other systems connecting a broad range of users through their respective user devices. Social networking systems may enable the users to build networks of connections between people that may share interests, work/employment, family and/or friend ties, or other social relationships. Thus, friends, family members, and other acquaintances may join websites and other services that may allow those users to interact. For example, users may join for the purposes of communication, sharing interests, posting photographs/videos, and/or promoting employment or product related information, to name a few potential sharing functions. Moreover, with advents in modern technology, users may post social media content to social networks while the user is out experiencing events, such as watching live concerts or attending sports games.

As a result of attending a live event, a user may experience some occurrence happen within the event prior to another user viewing the event on a broadcast (e.g., through a television broadcast or streamed over the Internet). Thus, the user attending the event may wish to share social media content concerning the event, such as a message of winning team or a photograph of a surprise guest to a concert. Unfortunately, this can spoil the surprise for other users if they happen to access the social networking service prior to the surprise being transmitted through broadcast media. Alternatively, social networking services applying a ban to social media distribution for all users or users at an event may end up blocking social media content that is harmless and would not otherwise cause spoilers for users in other locations.

BRIEF SUMMARY

This disclosure relates to social networking systems and distribution of social media content. Methods, systems, and techniques for applying a delay to distribution of social media content when the social media content includes the time sensitive content at an event are provided.

According to an embodiment, a method for use by a social networking system includes determining a location of a user, associating the location of the user with an event occurring at the location, accessing a social media content from a social networking account of the user, and verifying the social media content comprises time sensitive content corresponding to the event. The method further includes applying, using one or more hardware processors of a system, a delay to distribution of the social media content based on the time sensitive content.

According to another embodiment, a system for social networking includes a non-transitory memory storing social media information comprising a social media content; and one or more hardware processors in communication with the non-transitory memory. The one or more hardware processors of the system are configured to determine a location of a user, associate the location of the user with an event occurring at the location, access the social media content from a social networking account of the user, and verify the social media content comprises time sensitive content corresponding to the event. The one or more hardware processors are further configured to apply a delay to distribution of the social media content based on the time sensitive content.

According to another embodiment, a non-transitory computer readable medium comprising a plurality of machine-readable instructions which when executed by one or more processors of a server are adapted to cause the server to perform a method including determining a location of a user, associating the location of the user with an event occurring at the location, accessing a social media content from a social networking account of the user, and verifying the social media content comprises time sensitive content corresponding to the event. The method further includes applying, using one or more hardware processors of a system, a delay to distribution of the social media content based on the time sensitive content.

BRIEF DESCRIPTION OF THE DRAWINGS

The accompanying drawings, which form a part of the specification, illustrate embodiments of the invention and together with the description, further serve to explain the principles of the embodiments. It should be appreciated that like reference numerals may be used to identify like elements or similarly functioning elements illustrated in one or more of the figures. The drawing in which an element first appears is generally indicated by the left-most digit in the corresponding reference number.

FIG. 2A is an exemplary environment illustrating social media content posted by a user at an event delayed from distribution to another user, according to an embodiment.

DETAILED DESCRIPTION

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Figure 1:
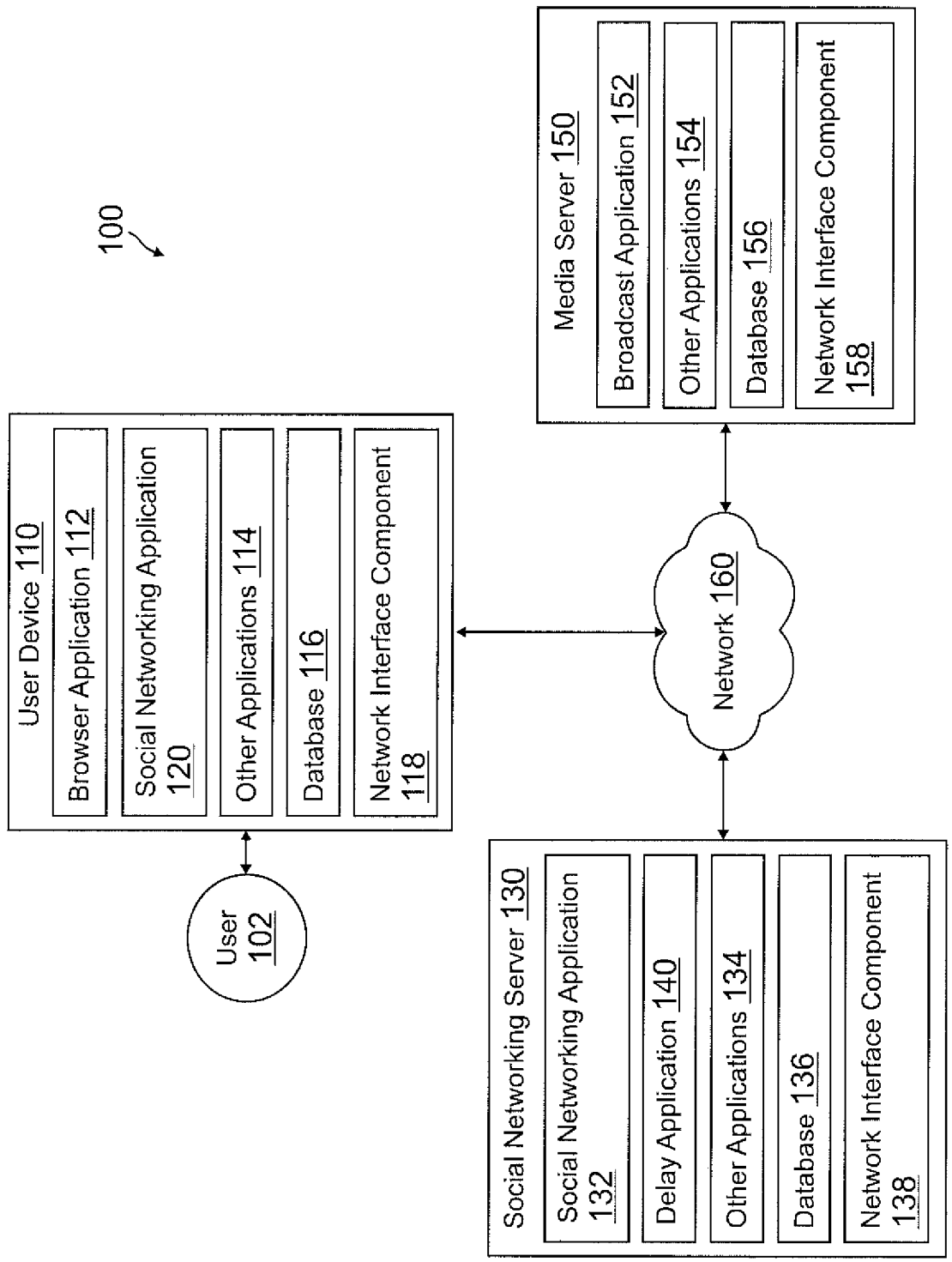
FIG. 1 is a simplified block diagram an exemplary system for delaying social media sharing based on a broadcast media transmission, according to an embodiment.

FIG. 1 illustrates an exemplary system for delaying social media sharing based on a broadcast media transmission, according to an embodiment. Terms like "machine," "device," "computer," and "computing system" are used interchangeably and synonymously throughout this document. System 100 may include a server computing system or a client computing system.

FIG. 1 is a block diagram of a networked system 100 suitable for implementing the processes described herein according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, an APPLE® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a user device 110, a social networking server 130, and a media server 150 in communication over a network 160. User device 110, social networking server 130, and media server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

In FIG. 1, user 102 may interact with social networking server 130 through user device 110. For example, user 102 may utilize user device 110 to transmit and receive social media content from social networking server 130. Additionally, media server 150 may transmit information, including broadcast media content and data related to broadcast media content to one or more of user device 110 and social networking server 130. User device 110 may be implemented using any appropriate hardware and software configured for wired and/or wireless communication with social networking server 130 and media server 150 over network 160. For example, in one embodiment, user device 110 may be implemented as a personal computer (PC), a smart phone, personal digital assistant (PDA), laptop computer, tablet computer and/or other types of computing devices capable of transmitting and/or receiving data. Although a user device is shown, the user device may be managed or controlled by any suitable processing device. Although only one user device is shown, a plurality of user devices may be utilized.

User device 110 may utilize one or more applications to transmit and receive social media content, which may include time sensitive content and thus be delayed from distribution by social networking server 130. In this regard, user device 110 contains a browser application 112, a social networking application 120, other applications 114, a database 116, and a network interface component 118. Browser application 112, social networking application 120, and other applications 114 may correspond to processes, procedures, and/or applications executable by a hardware processor, for example, a software program. In other embodiments, user device 110 may include additional or different software as required.

Browser application 112 may be implemented as a web browser configured to provide a convenient interface to permit user 102 to browse information available over network 160. Thus, browser application 112 may access information available over the Internet including a website of a social networking service (e.g., social networking server 130). In certain embodiments, browser application 112 may be used, for example, and establish, maintain, and utilize social networking accounts available on social networking server 130. Additionally, browser application 112 may be utilized to access and download an application corresponding to social networking server 130, such as a dedicated social networking application (e.g., social networking application 120). Browser application may download the application directly from social networking server 130, another online source corresponding to social networking server 130, and/or an online application marketplace containing the application download. Additionally, browser application 112 may access other service provider websites, such as media server 150 in order to view, download, or otherwise consume broadcast media content corresponding to an event.

In other embodiments, user 102 may utilize social networking application 120 to establish, maintain, and utilize social networking accounts available on social networking server 130. As previously discussed, social networking application 120 may be downloaded using browser application 112. However, social networking application 120 may also be installed and executed on user device 110 using other mediums, including flash drives or other portable memory, short range wireless communication downloads, or other sources.

Once a social networking account for user 102 is established, user 102 may utilize browser application 112 and/or social networking application 120 to transmit and receive social media content. Social media content may correspond to messages, images, video images, URL references (including hyperlinks), or other information/data transmitted for interaction among a group of users corresponding to the social networking account. For example, when establishing the social networking account with social networking server 130, user 102 may add "friends" or connections with the social networking account that correspond to a group of other social networking accounts belonging to users who may share interests, family, friends, employment, etc. Thus, user 102 may utilize social networking server 130 to "post" or "share" messages by transmitting social media content to connections of their social networking account. "Posting" or "sharing" social media content may include making the content available on a website for viewing, transmitting the social media content to other user devices (e.g., email, SMS/MMS messaging), or storing the content for retrieval by one or more social networking applications when executed by a user device. The additional information may include a location of user 102, associated events/users with user 102, or other information. In addition to sharing social media content, user 102 may utilize user device 110 to receive social media content using one of the aforementioned processes.

User 102 may transmit additional information with the social media content indicative of a location and/or event when sharing the social media content (e.g., within the social media content and/or as metadata to the social media content). The additional information about the location and/or event of user 102 may be transmitted through a location application/module of user device 110 (e.g., a mapping application and/or GPS module), information provided in the social media content, additional information on user device 110 (e.g., SMS/MMS/email message information), and/or metadata added to the social media content, including metadata added from one or more other applications of user device 110.

In various embodiments, user 102 may utilize user device 110 to transmit social media content while at an event. The social media content may include time sensitive content, such as an important moment in an event that would constitute a "spoiler" or revelation of some occurrence during the event to a person unaware of the likelihood of the occurrence happening. For example, the social media content may include a touchdown pass on the last play of a football game or a previously unknown singer joining a band for a last performance. In other embodiments, user 102 may utilize user device 110 to receive media content while observing a delayed broadcast of media content corresponding to the event. Thus, as will be explained in more detail herein, social media content transmitted and/or received through browser application 112 and/or social networking application 120 may include a delay to prevent the "spoiler" from being revealed to an unaware party.

In various embodiments, browser application 112 and social networking application 120 may be incorporated in the same application so as to provide their respective features in one convenient application interface.

User device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 160, or other types of applications. Other applications 114 may also include email, texting, voice and IM applications that allow a user to send and receive emails, calls, texts, and other notifications through network 160. Other applications 114 may include a location and/or mapping application for determining a location of user 102. In various embodiments, a location application of user device 110 may include or correspond to a check-in application configured to associate user 102 with a location using a check-in service over network 160. Other applications 114 may contain software programs, executable by a processor, including a graphical user interface (GUI) configured to provide an interface to the user.

User device 110 may further include database 116 which may include, for example, identifiers such as operating system registry entries, cookies associated with browser application 112, social networking application 120, and/or other applications 114, identifiers associated with hardware of user device 110, or other appropriate identifiers, such as identifiers used for user/account/device authentication or identification. In certain embodiments, identifiers in database 116 may be used by an account provider, such as social networking server 130, to associate user device 110 with a particular account maintained by the account provider. Database 116 may include access information for one or more user accounts.

In various embodiments, user device 110 includes at least one network interface component 118 adapted to communicate with social networking server 130 and/or media server 150 over network 160. In various embodiments, network interface component 118 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Social networking server 130 may be maintained, for example, by an social networking service, which may provide one or more social networks to users for establishing social networking accounts, connecting to other social networking accounts, and sharing social media content. In this regard, social networking server 130 may include one or more applications configured to receive social media content from a user, such as user 102, and distribute the social media content to at least one other social networking account. Additionally, social networking server 130 includes one or more applications configured to delay distribution of the social media content corresponding to an event in order to synchronize the distribution with a broadcast of media content corresponding to the event. While social networking server 130 is shown as separate from media server 150, it is understood that some or all of the processes and/or services provided by social networking server 130 may be incorporated within media server 150.

Social networking server 130 includes a social network application 132, a delay application 140, other applications 134, a database 136, and a network interface component 138. Social network application 132, delay application 140, and other applications 134 may correspond to processes, procedures, and/or applications executable by a hardware processor, for example, a software program. In other embodiments, social networking server 130 may include additional or different software as required.

Social network application 132 may be configured to provide social networking services to a plurality of users, including user 102, over network 160. In this regard, social network application 132 includes one or more processes to allow user 102 to establish, maintain, and utilize a social networking account for use in social networking with one or more other users. Social network application 132 may establish the social networking account for user 102 based on received information and complete registration of the account. Received information may correspond to user 102's personal information as well as images and/or videos of user 102, email or contact information for user 102, and/or financial/payment information for user 102. Once a social networking account is established by user 102, social network application 132 may allow user 102 to maintain the account and utilize the account to engage in social networking, including the distribution of social media.

Distribution of social media content by social network application 132 may include receiving social media content by a holder of a social networking account, such as user 102. As previously discussed, social media content may correspond to a message, data content (e.g., image and/or video), URL or hyperlink to further content, etc. Social media content may further include location and/or event information corresponding to the user transmitting the social media content (e.g., user 102). Thus, social network application 132 may determine a location of the user transmitting the social media content, social network application 132 may determine if the location for the user (e.g., user 102) corresponds to an event. The event may have broadcast media content corresponding to the event using traditional media channels (e.g., television broadcast). Social network application 132 may determine if the location corresponds to an event through content within the social media content (e.g., text, image, video), through a URL or link within or associated with the social media content, through a link or identifier to another person, place, and/or thing within or associated with the social media content, or other information corresponding to the social media content.

If the location of the user corresponds to an event, social networking server 130 may utilize delay application 140 to determine if the social media content requires a delay and if so, to delay distribution of the social media content. Thus, delay application 140 may be utilized to determine if the social media content includes time sensitive content corresponding to the event, such as a revelation of an occurrence during the event. For example, time sensitive content may correspond to a play during a sporting event, a performance during a concert, a scene during a play or show, etc. Exemplary non-time sensitive content may include purchases of food during a sporting event, greetings or requests for correspondence not related to the event, personal pictures without depicting the event or from a much earlier time during the event. Delay application 140 may be configured to determine and verify the social media content includes time sensitive content using the social media content, text analysis of the social media content, an image or video in the social media content, a navigational instrument of user device 110 (i.e. a compass), a location check-in by the user (e.g., through a check-in application of user device 110), a timestamp of the social media content, and/or a previous social media content by the social networking account.

If delay application 140 determines the social media content includes time sensitive content, delay application 140 may apply a delay to distribution of the social media content. Thus, delay application 140 may prevent "posting" or "sharing" the social media content, as previously discussed, for a designated time period. In order to apply a delay to distribution of the social media content, delay application 140 may need to determine an appropriate delay to apply to distribution of the social media content. Determination of the delay may include receiving a broadcaster delay directly from the broadcaster of the broadcast media content corresponding to the event (e.g., receiving a broadcaster delay from media server 150). In such embodiments, delay application 140 may determine the delay is sufficient to prevent "spoilers" by distributing the social media content too early. For example, media server 150 may include a 5 second delay to broadcast media content correspond to the event to account for on-air emergencies. Thus, by applying a 5 second delay to the distribution of the social media content, delay application 140 may ensure that no "spoilers" are released with the social media content.

In other embodiments, delay application 140 may be required to determine a delay to apply to distribution of the social media content without a broadcasters delay. Thus, delay application 140 may receive, access, and/or process the broadcast media content corresponding to the event and transmitted by media server 150. Through the broadcast media content, delay application 140 may determine an appropriate delay to apply to distribution of the social media content. The delay may account for broadcaster delay, commercial delay, emergency situations, or other factors.

After the delay is applied to distribution of the social media content, social network application 132 may distribute the social media content. As previously discussed, social network application 132 may "post" or make the social media content available on a website, may transmit the social media content through SMS/MMS/email, or may store the social media content for retrieval by other users, potentially utilizing social networking applications.

In various embodiments, some or all of the features of social network application 132 and delay application 140 may be incorporated in the same application so as to provide their respective features in one convenient application.

In various embodiments, social networking server 130 includes other applications 134 as may be desired in particular embodiments to provide features for social networking server 130. For example, other applications 134 may include security applications for implementing server-side security features, programmatic server applications for interfacing with appropriate application programming interfaces (APIs) over network 160, or other types of applications. Other applications 134 may contain software programs, such as a graphical user interface (GUI), executable by a processor that is configured to provide an interface to the user.

Social networking server 130 includes database 136, which may be configured to store user account identifiers, social media content, broadcaster delay(s), and/or broadcast media content. Database 136 may further include user information and user account information for social networking accounts, as previously discussed. Database 136 may also include information about events occurring at locations, including sport, concerts, performance, and/or political event schedules.

In various embodiments, social networking server 130 includes at least one network interface component 138 adapted to communicate with network 160 including user device 110 and/or media server 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Media server 150 may be maintained, for example, by a media broadcaster, which may generate, receive, and/or distribute broadcast media content, including traditional media content of an event for transmission to a display. For example, media server 150 may provide television transmission signals, including analog and/or digital signals using radio, cable, satellite, etc. mediums. In this regard, media server 150 may include one or more applications configured to receive recorded media content transmitted from an event recorder, such as a camera crew including image and/or video cameras recording an event. Additionally, media server 150 includes one or more applications configured to create and distribute broadcast media content corresponding to the received media content by transmitting the broadcast media content to televisions, streaming website, etc. for viewing by users. Media server 150 may include delays to the broadcast media content accounting for a broadcaster delay, signal transmission, receipt of broadcast media content from the event recorder, commercial, or other source. While media server 150 is shown as separate from social networking server 130, it is understood that some or all of the processes and/or services provided by media server 150 may be incorporated within social networking server 130.

Media server 150 includes a broadcast application 152, other applications 154, a database 156, and a network interface component 158. Broadcast application 152 and other applications 154 may correspond to processes, procedures, and/or applications executable by a hardware processor, for example, a software program. In other embodiments, media server 150 may include additional or different software as required Media server 150 may execute broadcast application 152 to receive media content from a source recording an event occurring at a location of a user, such as user 102. A source recording an event may correspond to a camera, camera crew (including a plurality of cameras), correspondent, or other entity providing a media content data stream/recording of the event. Broadcast application 152 may receive the media content and process the media content for transmission as broadcast media content to viewers (e.g., user 102). By processing the media content, broadcast application 152 may remove sections of the media content, make selections of cameras and/or camera angles to add to the media content, include or alter sound and/or sound effects of the media content, add commercials or determine commercial breaks for the media content, or otherwise process the media content for distribution as broadcast media. Thus, after processing the media content, broadcast application 152 may include a delay to the media content to account for processing time, commercials, etc. The delay may correspond to a time difference between the actual time the event is occurring and a time a user viewing the broadcast media content watches the event.

Broadcast application 152 may then distribute the broadcast media content for viewing by users, including potentially user 102. A user may utilize a display, such as a television, computer display, user device display, etc. to view the broadcast media content. Due to the delay applied to the broadcast media content, the user views occurrences during the event at a different time than a user viewing the event live. In addition to a user receiving and viewing the broadcast media content, social networking server 130 may receive the broadcast media content and/or information corresponding to the broadcast media content, including the delay corresponding to the broadcast media content.

In various embodiments, media server 150 includes other applications 154 as may be desired in particular embodiments to provide features for media server 150. For example, other applications 154 may include security applications for implementing server-side security features, programmatic server applications for interfacing with appropriate application programming interfaces (APIs) over network 160, or other types of applications. Other applications 154 may contain software programs, such as a graphical user interface (GUI), executable by a processor that is configured to provide an interface to the user. Other application 154 may include processing applications for media content and commercials, including addition of commercials to broadcast media content, editing of commercials and media content, etc. Other application 154 may include applications configured to provide an interface enabling an administrator of media server 150 to configure and/or alter a delay to the broadcast media content.

Media server 150 includes database 156, which may be configured to store user account identifiers, media content, broadcast media content, broadcaster delay(s), and/or additional content for addition to broadcast media content (e.g., audio/video content, commercials, etc.). Database 156 may further include user information and user account information for user accounts with or corresponding to media server 150.

In various embodiments, media server 150 includes at least one network interface component 158 adapted to communicate with network 160 including user device 110 and/or social networking server 130. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, for example the various components of system 100 of FIG. 1.

Figure 2B:
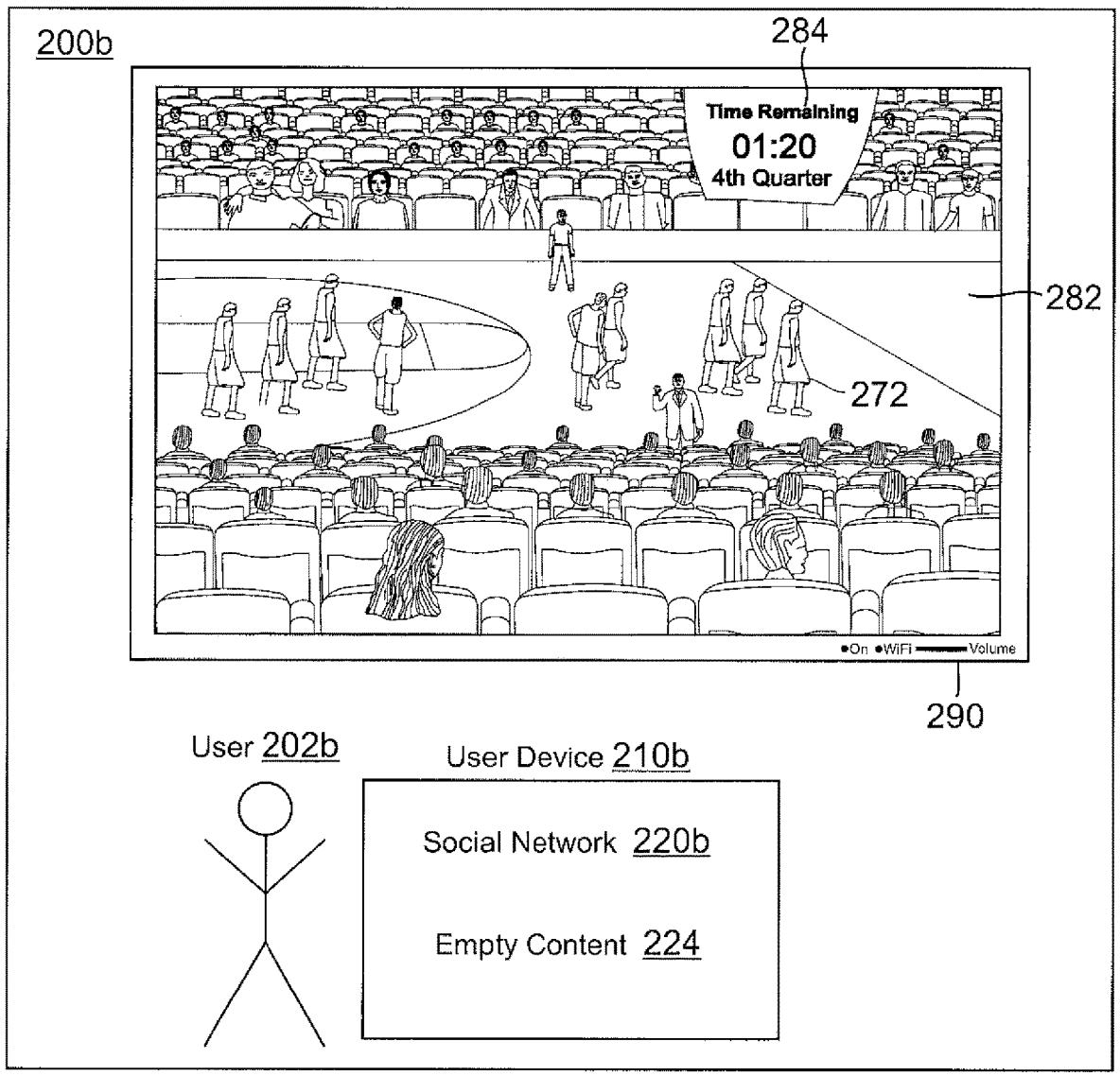
FIG. 2B is an exemplary environment illustrating social media content posted a user at an event delayed from distribution to another user, according to an embodiment.

FIG. 2A and FIG. 2B are exemplary environments illustrating social media content posted by a user at an event delayed from distribution to another user, according to an embodiment. FIG. 2A and FIG. 2B show two exemplary environments occurring at the same time, but having different timed views of an event due to a delay for a broadcast media content of the event. Thus, both user 202a and user 202b may view an event at their respective times.

In FIG. 2A, user 202a views event 270, such as by attending a venue (e.g., a sports stadium, concert hall, etc.). As shown in FIG. 2A, event 270 occurring in environment 200a may correspond to a sports event having time sensitive event 272 happening, shown occurring at 00:15 in the 4$^{th}$ quarter on event clock 274. Time sensitive event 272 may include information about some occurrence during event 270, such as a sports play (e.g., last minute field goal/free throws, touchdown pass, homerun hit, last play of a game, or other occurrence). Time sensitive event 272 is "time sensitive" within the context of event 270 because it may include information about some occurrence, event, or content that a user would not know or expect to occur during event 270 to a user not viewing the event at the same time as user 202a. For example, time sensitive event 272 may include an unexpected event that changes event 270 in a particular way, such as a score, outcome, performance, etc. Thus, a user not viewing event 270 would not know or expect time sensitive event 272 to occur or occur at the particular time at which time sensitive event 272 occurred.

User 202a viewing the occurrence in event 270 correspond to time sensitive event 272 may utilize user device 210a to access and view social network 220a. User device 210a may correspond generally to user device 110 of FIG. 1. Thus, user device 210a may execute similar applications and processes in order to access social network 220a. When accessing social network 220a, user 202a may log in to a social networking account and thus view social network 220a. User 202a may then utilize user device 210a to transmit time sensitive content 222 for use with social network 220a (e.g., for posting and/or transmission to other user's social networking accounts associated with user 202a's social networking account). In various embodiments, user 202a may transmit general information, such as a weather condition, location, consumed food, or other information that may not correspond to event 270 or correspond so generally to event 270 that other users are aware of the information. However, in the embodiment of FIG. 2A, time sensitive content 222 includes information about time sensitive event 272. Thus, another user linked to a social networking account of user 202a and receiving time sensitive content 222 may receive a "spoiler" of time sensitive event 272 if the other user views time sensitive content 222 prior to the user viewing the occurrence of time sensitive event 272 during a broadcast media content corresponding to event 270.

Thus, environment 200*b* displays user 202*b* viewing television 280 displaying broadcast media content 282 corresponding to event 270. As shown in FIG. 2B, broadcast media content 282 displays information corresponding to event 272 but at a different time than the occurrence corresponding to time sensitive event 272, shown by event clock 284 at 01:20 in the 4$^{th}$ quarter. Thus, user 202*b* viewing broadcast media content 282 is viewing a delayed broadcast of media content corresponding to event 270. While viewing broadcast media content 282, user 202*b* may utilize user device 210*b* to access social network 220*b*. User device 220*b* may also correspond generally to user device 110 of FIG. 1. Thus, user device 210*b* may execute similar applications and processes in order to access social network 220*b*. When accessing social network 220*b*, user 202*b* may log in to a social networking account and thus view social network 220*b*. User 202*b* may then utilize user device 210*b* to receive and/or view social media content published/distributed to social network 220*b* by another user, such as user 202*a*.

However, as shown in FIG. 2B, social network 220*b* displays empty content 224, which may correspond generally to a lack of displayable social media content, or social media content that does not include time sensitive content 222. Social network 220*b* may include empty content 224 based on a delay for distribution of time sensitive content 222. For example, based on broadcast media content 282 delay (e.g., corresponding to a time difference between event clock 274 and event clock 284), time sensitive content 222 transmitted by user 202*a* may not display on social network 220*b* to user 202*b* until event clock 284 synchronizes to the time of occurrence of time sensitive event 272 displayed on event clock 274. The difference in delay between the occurrence of time sensitive event 272 during event 270 and media broadcast content 282 displayed on television 280 may be a delay (e.g., broadcaster delay, commercial delay, etc.) that prevents display of time sensitive content 222 until the occurrence of time sensitive event 272 during media broadcast content 282. Therefore, user 202*b* may not view social media content 272 having information about time sensitive event 272.

Figure 3:
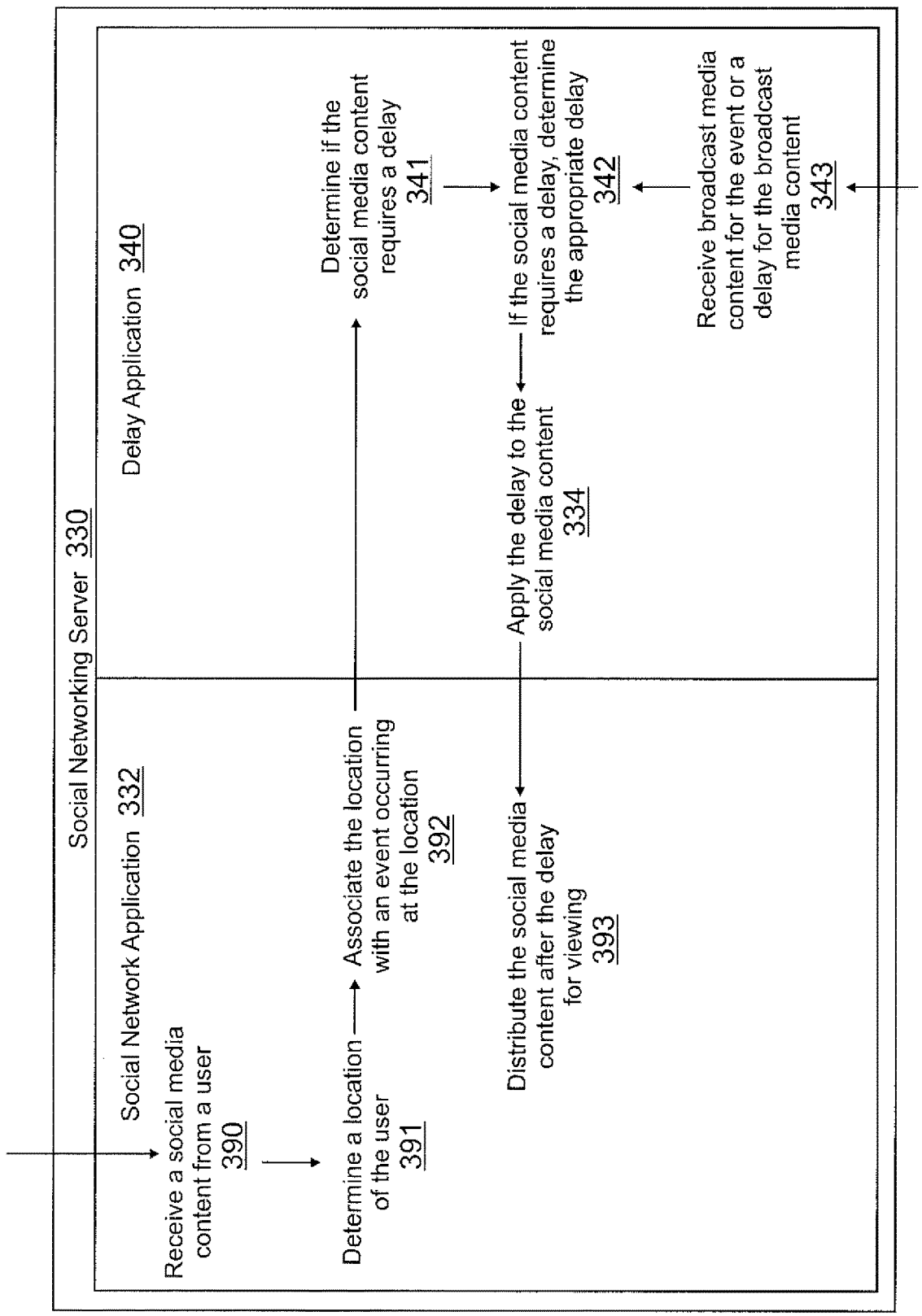
FIG. 3 is a simplified block diagram and flowchart illustrating an exemplary social networking server for determining social media content includes time sensitive content and applying a delay to the social media content, according to an embodiment.

FIG. 3 is a simplified block diagram and flowchart illustrating an exemplary social networking server for determining social media content includes time sensitive content and applying a delay to the social media content, according to an embodiment. Although the application components of social networking server 330 are shown residing in one structure, it is understood each component may be implement and/or executed by a separate computer system or processor.

Social networking server 330 executes social network application 332 to receive social media content from a user at block 390. Social media content may correspond to any content received from a user and utilized within a social network corresponding to social network application 332. For example, social media may be a message post, image, and/or video meant to be shared within a user's social network established by the user's social networking account. The social media content, information transmitted with or prior to the social media content, and/or metadata included with the social media content may be analyzed to determine a location of the user at block 391. In order to determine the location of the user at block 391 by social network application 332, social network application may request a location (e.g., through a direct request, option to link a location of the user with the social media content, etc.) or may determine the location based on other data related to the user. The other data may include previous social media posts that include a location, the user's user device location software/hardware, and/or metadata attached to the social media content. The metadata may relate to a name of an event and/or venue of the event, a name/link to another user, etc. Thus, location specific metadata may be used to determine the location of the user.

Once the location of the user is determined, the location of the user is associated with an event by social networking application 332, at block 392. The location of the user may be associated with an event by determining if an event is occurring at the location of the user through information available to social networking application available over a network, such as the Internet. In certain embodiments, social networking server 330 may include information available in a database (not shown) of events occurring at locations, such as schedules of events with corresponding locations.

If an event is occurring at the location of the user, delay application 340 determines if the social media content requires a delay at block 341. Delay application 304 may be executed by social networking server 330 in order to prevent social media content containing time sensitive content from being published to one or more social networks prior to the occurrence corresponding to time sensitive content airing during broadcast media content. Thus, at block 341, delay application 340 determines if the social media content includes time sensitive content. Determining if the social media content includes time sensitive content includes both determining whether the social media content includes "spoilers" or content another user would not think/expect to occur, and if the occurrence has yet to air during the broadcast media content. For example, the social media content may contain general information about a user posting the social media content that has no relationship to occurrences in an event or include information about an occurrence that was well publicized and known to occur. Thus, the social media content would not include time sensitive content. The social media content may include information about an unexpected or surprise occurrence during an event, however the event may have occurred a substantially long enough time in the past that broadcast media content has already transmitted for display the occurrence. In such an embodiment, the social media content would not include time sensitive content.

However, if the social media content includes time sensitive content, such as an unexpected occurrence that has not been broadcast for viewing with the broadcast media content, then delay application 340 determines the social media content includes time sensitive content and determines an appropriate delay to distribution of the social media content, at block 342. In order to determine the delay required for distribution of the social media content, at block 343, delay application 340 receives broadcast media content for the event or a delay for the broadcast media content. Delay application 340 may determine the appropriate delay after receiving the information at block 343 by receiving a broadcaster delay from a broadcaster of the broadcast media content, and applying the broadcaster delay (or the calculated delay to broadcast of the broadcast media content after receiving the broadcaster delay). In other embodiments, delay application 340 may utilize the broadcast media content directly to determine the delay by determining a difference in synchronization from a live feed of the event and the broadcast media content. Delay application 340 may further account for information within the broadcast of the broadcast media content, such as delays caused by interviews, commercials, or other added content.

Once an appropriate delay is determined at block 342, the delay is applied to the social media content by delay application 340, at block 334. Thus, delay application 340 may prevent distribution of the social media content until expiration of the delay. As previously discussed, some or all of the functions and processes described in relation to social network application 332 and delay application 340 may be incorporated within the same application. Thus, the delay determination and/or application may be applied by one or more of social network application 332 and/or delay application 340. Once the delay expires, social network application distributes the social media content for viewing, at block 393.

Figure 4:
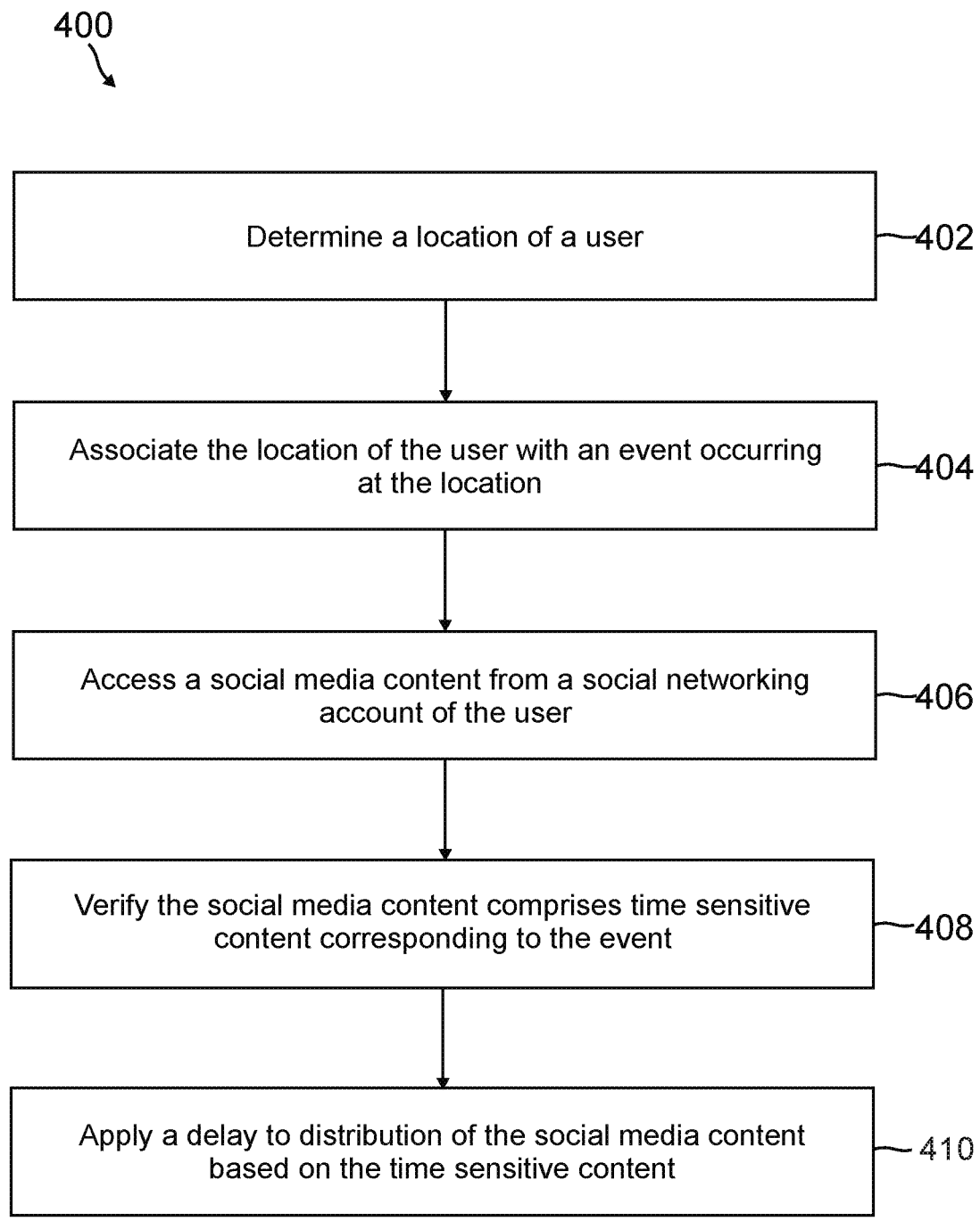
FIG. 4 is an exemplary flowchart illustrating a method of delaying social media sharing based on a broadcast media transmission, according to an embodiment.

FIG. 4 is an exemplary flowchart illustrating a method of delaying social media sharing based on a broadcast media transmission, according to an embodiment. Note that one or more steps, processes, and methods described herein may be omitted, performed in a different sequence, or combined as desired or appropriate.

At step 402, a location of a user is determined. The location may be determined through a location module/application of a user device corresponding to the user, a location service corresponding to the system (e.g., a GPS system), the social media content, and a previous social media content by the social networking account. Once a location is determined, the location of the user is associated with an event occurring at the location, at step 404. The association of the location and the event may occur based on information locally or externally available and include schedules, metadata, and similar available data. The event may correspond to a sporting event, concert, rally, show/production, etc. at the location.

Social media content from a social networking account of the user may be accessed, at step 406. Social media content may correspond to content provided by the user for the purpose of distributing within a social network to other social networking accounts. Thus, at step 408, the social media content is verified to comprise time sensitive content corresponding to the event. The verification may use the social media content, text analysis of the social media content, an image or video in the social media content, a navigational instrument of a user device corresponding to the user, a location check-in by the user, a timestamp of the social media content, and a previous social media content by the social networking account. For example, text analysis of the content may include identifying names of events, locations, and/or entities in the event (e.g., players, actors, teams, etc.), or may include analysis to determine if the content includes specific actions that may occur during the event (e.g., key words denoting a play, a scene, or other occurrence that may happen during the event). The social media content may include tags (e.g., hyperlinks, hash-tagged names, etc.) that correspond to a person, event, and/or location that may be analyzed and used to determine the social media content comprises time sensitive content. In additional embodiments, a time stamp of the social media content may correspond to time of an occurrence in the event, or may be used to determine that the social media content is posted by the user prior to the airing of the same time in a media broadcast content. Previous social media content may include time sensitive content, and thus it may be inferred the user is posting time sensitive content if the user is still located at the event or the social media content is posted within a close time range of the previous social media content. Other embodiments may utilize pictorial/image analysis to determine if players, actors, teams, and/or occurrence in an image comprise time sensitive content.

The time sensitive content may comprise content occurring before a broadcast of broadcaster media content corresponding to the event. In various embodiments, the social networking account of the user may be identified as a high risk account. Thus, the verification that the social media content comprises the time sensitive content may use the identification. The account may be identified as high risk based on the user of the account (e.g., a sideline reporter, producer of broadcast media content, etc.) or may be based on past social media content (e.g., repeated use of time sensitive content in the past).

At step 410, a delay to distribution of the social media content is applied based on the time sensitive content. In various embodiments, broadcast media content corresponding to the event may be received and the delay may be determined using the broadcaster media content. For example, the event may comprise a sporting event, and the delay may account for commercial breaks and a broadcast delay. In other embodiments, a broadcaster delay for the broadcast media content may be received and comprise the delay.

Figure 5:
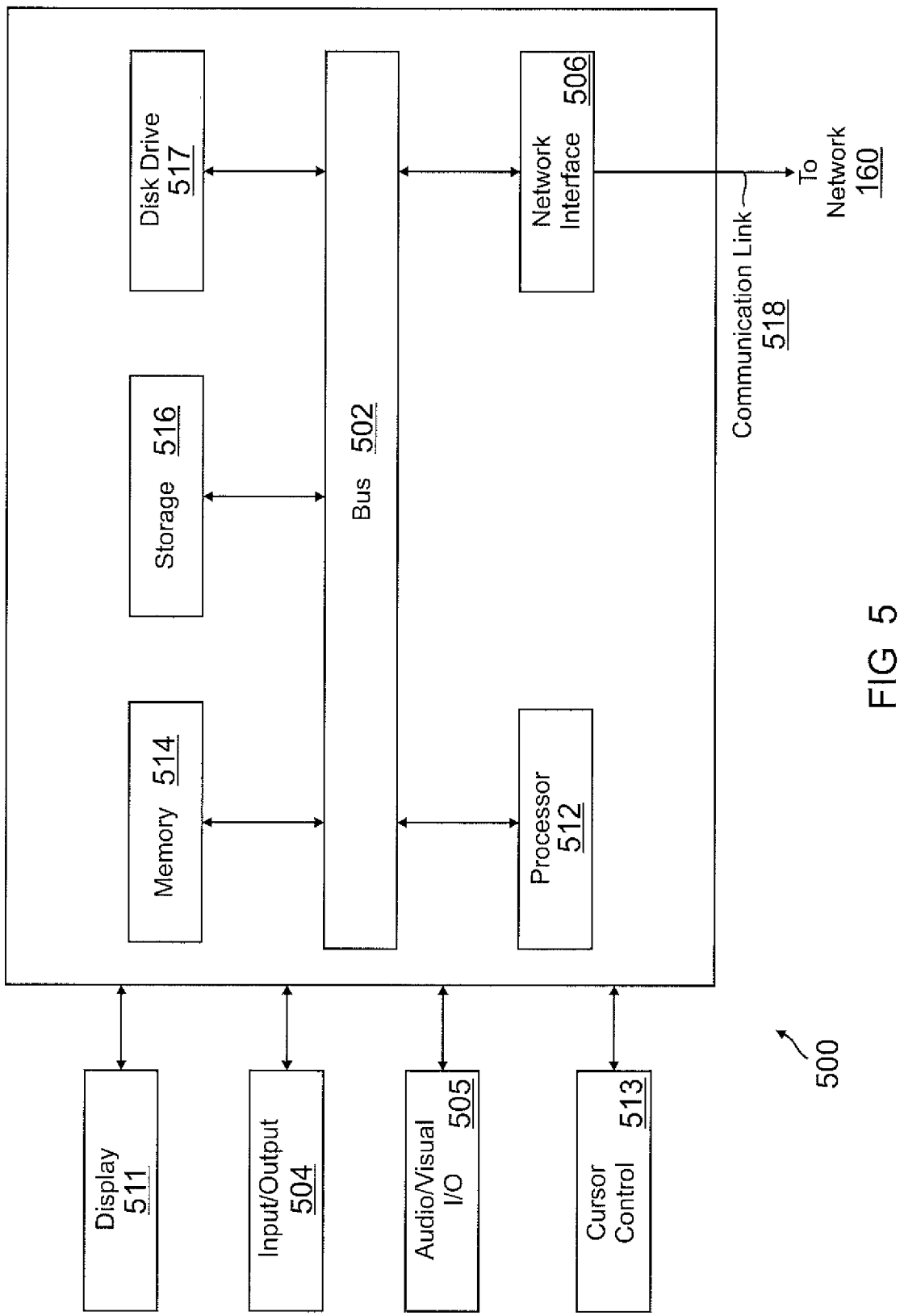
FIG. 5 is a simplified block diagram of a computer system suitable for implementing one or more embodiments of the present disclosure.

FIG. 5 is a block diagram of a computer system 500 suitable for implementing one or more embodiments of the present disclosure. In various embodiments, the endpoint may comprise a personal computing device (e.g., smart phone, a computing tablet, a personal computer, laptop, PDA, Bluetooth device, key FOB, badge, etc.) capable of communicating with the network. The merchant server and/or service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another endpoint, a merchant server, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the fatal of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to, practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method performed by a social network application of a social network, the method comprising:
   accessing, by the social network application of the social network, an upload of social media content of a live event occurring at a location and metadata for the social media content from a social networking account of a user prior to posting the social media content within the social network, wherein the social media content is uploaded or transmitted by the user while attending the live event occurring at the location;
   determining a uniform resource locator (URL) link and an identifier of the live event occurring at the location based on the social media content;
   determining the live event occurring at the location based on the URL link and the identifier;
   detecting a digital check-in of the user at the location with an online location check-in service;
   in response to detecting the digital check-in of the user, verifying, through key word analysis of the social media content, the social media content comprises time sensitive content corresponding to the live event using the metadata, information for the live event, and the digital check-in;
   wherein the time sensitive content is an important moment in the live event that would constitute an unexpected event of some occurrence during the live event to other users not viewing the live event at same time as the user;
   accessing recorded media content of the live event;
   generating a live broadcast of the live event based on the recorded media content of the live event, wherein the generating the live broadcast comprises removing at least one section of the recorded media content and adding at least one additional section to the recorded media content;
   determining a signal transmission delay associated with the live broadcast of the live event to a general public using a media broadcast system based on the generating the live broadcast;
   determining that the time sensitive content has not been broadcast during the live broadcast of the live event based on a timestamp in the social media content and the signal transmission delay;
   determining non-time sensitive content of the social media content based on the social media content;
   preventing posting of the time sensitive content for a designated time period, by the social networking account based on the determining that the time sensitive content has not been broadcast, wherein the preventing posting of the time sensitive content comprises applying a delay to distribution of the social media content based on the time sensitive content, wherein the delay comprises a time delay to account for commercial breaks and a broadcast delay;
   posting the non-time sensitive content to the social networking account without the time sensitive content;
   determining a time of occurrence of the time sensitive content in the social media content based on the timestamp in the social media content;
   determining that the time of occurrence of the time sensitive content in the social media content is synchronized with the live broadcast based on information in the live broadcast;

determining that the live broadcast displays the time sensitive content based on the delay between a real-world occurrence of the live event at the location and the live broadcast of the live event;

and in response to determining that the live broadcast is synchronized with the time of occurrence of the time sensitive content in the social media content, posting the time sensitive content to the social networking account.

2. The method of claim 1, further comprising:
determining the location of the user using at least one of a location module of a user device corresponding to the user, a location service corresponding to the system, or a previous social media content by the social networking account.

3. The method of claim 1, wherein the verifying the social media content comprises the time sensitive content uses at least one of the social media content, the social media content, an image or video in the social media content, the timestamp of the social media content, or a previous social media content by the social networking account.

4. The method of claim 1, further comprising:
identifying the social networking account as a high risk account based on past social media content,
wherein the social media content is verified as comprising time sensitive content in response to the identifying.

5. The method of claim 1 further comprising:
receiving a broadcaster delay for the live broadcast of the live event,
wherein the signal transmission delay further comprises the broadcaster delay.

6. The method of claim 1, wherein the determining the signal transmission delay associated with the live broadcast is based on at least a length of the at least one additional section added to the recorded media content.

7. The method of claim 6, wherein the live event comprises a sporting event.

8. The method of claim 1, wherein the time sensitive content comprises a recording or message content that discloses the live event.

9. The method of claim 1, wherein the metadata further comprises navigational instrument directions for compass application of a device at a time of capturing visual content in the social media content, and wherein the verifying the social media content comprises the time sensitive content further determines that the navigational instrument directions indicate that the visual content captures an image or video of the live event occurring at the location.

10. A system comprising:
a non-transitory memory storing social media information comprising social media content and a social networking application of a social network; and
one or more hardware processors in communication with the non-transitory memory and the social networking application is configured to:
access, by the social networking application of the social network, an upload of social media content of a live event occurring at a location and metadata for the social media content from a social networking account of a user prior to posting the social media content within the social network, wherein the social media content is uploaded or transmitted by the user while attending the live event occurring at the location;
determine a uniform resource locator (URL) link and an identifier of the live event occurring at the location based on the social media content;
determine the live event occurring at the location based on the URL link and the identifier;
detect a digital check-in of the user at the location with an online location check-in service;
in response to detecting the digital check-in of the user, verify, through key word analysis of the social media content, the social media content comprises time sensitive content corresponding to the live event using the metadata, information for the live event, and the digital check-in;
wherein the time sensitive content is an important moment in the live event that would constitute an unexpected event of some occurrence during the live event to other users not viewing the live event at same time as the user;
access recorded media content of the live event;
generate a live broadcast of the live event based on the recorded media content of the live event, wherein the generating the live broadcast comprises removing at least one section of the recorded media content and adding at least one additional section to the recorded media content;
determine a signal transmission delay associated with the live broadcast of the live event to a general public using a media broadcast system based on the generating the live broadcast;
determine that the time sensitive content has not been broadcast during the live broadcast of the live event based on a timestamp in the social media content and the signal transmission delay;
determine non-time sensitive content of the social media content based on the social media content;
prevent posting of the time sensitive content for a designated time period, by the social networking account based on the determining that the time sensitive content has not been broadcast, wherein the preventing posting of the time sensitive content comprises applying a delay to distribution of the social media content based on the time sensitive content, wherein the delay comprises a time delay to account for commercial breaks and a broadcast delay;
post the non-time sensitive content to the social networking account without the time sensitive content;
determine a time of occurrence of the time sensitive content in the social media content based on the timestamp in the social media content;
determine that the time of occurrence of the time sensitive content in the social media content is synchronized with the live broadcast based on information in the live broadcast;
determine that the live broadcast displays the time sensitive content based on the delay between a real-world occurrence of the live event at the location and the live broadcast of the live event;
and in response to determining that the live broadcast is synchronized with the time of occurrence of the time sensitive content in the social media content, post the time sensitive content to the social networking account.

11. The system of claim 10, wherein the one or more hardware processors are further configured to:
determine the location of the user using at least one of a location module of a user device corresponding to the user, a location service corresponding to the system, the social media content, or a previous social media content by the social networking account.

12. The system of claim 10, wherein verifying the social media content comprises the time sensitive content using at least one of the social media content, text analysis of the social media content, an image or video in the social media content, a navigational instrument of a user device corresponding to the user, the timestamp of the social media content, or a previous social media content by the social networking account.

13. The system of claim 10, wherein the one or more hardware processors are further configured to:
identify the social networking account as a high risk account based on past social media content,
wherein the social media content is verified as comprising time sensitive content in response to identifying the social networking account as the high risk account.

14. The system of claim 10, wherein the one or more hardware processors are further configured to:
receive a broadcaster delay for the live broadcast of the live event,
wherein the signal transmission delay further comprises the broadcaster delay.

15. The system of claim 10, wherein the signal transmission delay associated with the live broadcast is determining based on at least a length of the at least one additional section added to the recorded media content.

16. The system of claim 15, wherein the delay comprises a time delay to account for commercial breaks and a broadcast delay.

17. The system of claim 10, wherein the time sensitive content comprises content occurring before the live broadcast of the live event.

18. A non-transitory computer readable medium comprising a plurality of machine-readable instructions which when executed by one or more processors of a server are adapted to cause the server to perform a method performed by a social network application of a social network, the method comprising:
determining a location of a user;
accessing, by the social network application of the social network, an upload of social media content of a live event occurring at a location and metadata for the social media content from a social networking account of a user prior to posting the social media content within the social network, wherein the social media content is uploaded or transmitted by the user while attending the live event occurring at the location;
determining a uniform resource locator (URL) link and an identifier of the live event occurring at the location based on the social media content;
determining the live event occurring at the location based on the URL link and the identifier;
detecting a digital check-in of the user at the location with an online location check-in service;
in response to detecting the digital check-in of the user, verifying, through key word analysis of the social media content, the social media content comprises time sensitive content corresponding to the live event using the metadata, information for the live event, and the digital check-in;
wherein the time sensitive content is an important moment in the live event that would constitute an unexpected event of some occurrence during the live event to other users not viewing the live event at same time as the user;
accessing recorded media content of the live event;
generating a live broadcast of the live event based on the recorded media content of the live event, wherein the generating the live broadcast comprises removing at least one section of the recorded media content and adding at least one additional section to the recorded media content;
determining a signal transmission delay associated with the live broadcast of the live event to a general public using a media broadcast system based on the generating the live broadcast;
determining that the time sensitive content has not been broadcast during the live broadcast of the live event based on a timestamp in the social media content and the signal transmission delay;
determining non-time sensitive content of the social media content based on the social media content;
preventing posting of the time sensitive content for a designated time period, by the social networking account based on the determining that the time sensitive content has not been broadcast, wherein the preventing posting of the time sensitive content comprises applying a delay to distribution of the social media content based on the time sensitive content, wherein the delay comprises a time delay to account for commercial breaks and a broadcast delay;
posting the non-time sensitive content to the social networking account without the time sensitive content;
determining a time of occurrence of the time sensitive content in the social media content based on the timestamp in the social media content;
determining that the time of occurrence of the time sensitive content in the social media content is synchronized with the live broadcast based on information in the live broadcast;
determining that the live broadcast displays the time sensitive content based on the delay between a real-world occurrence of the live event at the location and the live broadcast of the live event;
and in response to determining that the live broadcast is synchronized with the time of occurrence of the time sensitive content in the social media content, posting the time sensitive content to the social networking account.

19. The non-transitory computer readable medium of claim 18, wherein the determining the signal transmission delay associated with the live broadcast is based on at least a length of the at least one additional section added to the recorded media content.

* * * * *